United States Patent
Smith et al.

(10) Patent No.: US 11,840,132 B2
(45) Date of Patent: *Dec. 12, 2023

(54) REAR HARD ENCLOSURE FOR A SOFT TOP

(71) Applicant: Bestop, Inc., Louisville, CO (US)

(72) Inventors: David A. Smith, Macomb Township, MI (US); Charles C. Turney, Toledo, OH (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,181

(22) Filed: Sep. 8, 2022

(65) Prior Publication Data

US 2023/0001775 A1    Jan. 5, 2023

Related U.S. Application Data

(63) Continuation of application No. 17/190,075, filed on Mar. 2, 2021, now Pat. No. 11,465,475.

(60) Provisional application No. 62/984,068, filed on Mar. 2, 2020.

(51) Int. Cl.
  *B60J 7/12* (2006.01)
  *B60J 7/02* (2006.01)
  *B60J 1/08* (2006.01)
  *B60J 1/18* (2006.01)

(52) U.S. Cl.
  CPC .............. *B60J 7/126* (2013.01); *B60J 1/085* (2013.01); *B60J 1/1807* (2013.01); *B60J 7/028* (2013.01)

(58) Field of Classification Search
  CPC . B60J 7/126; B60J 1/085; B60J 1/1807; B60J 7/1291; B60J 7/061; B60J 7/065; B60J 7/064; B60J 7/1226; B60J 7/028
  USPC ............. 296/107.18, 107.09, 107.16, 146.14
  See application file for complete search history.

(56) References Cited

U.S. PATENT DOCUMENTS

| | | | | |
|---|---|---|---|---|
| 2,572,592 A * | 10/1951 | Brandt | ................... | B60R 13/07 296/107.05 |
| 8,845,005 B2 * | 9/2014 | Houtari | ................... | B60J 7/064 296/107.13 |
| 10,166,848 B2 * | 1/2019 | Lewis | ...................... | B60J 7/061 |
| 10,556,489 B2 * | 2/2020 | Lewis | ....................... | B60J 7/11 |
| 10,603,994 B2 * | 3/2020 | Haberkamp | ............. | B60J 7/061 |
| 2007/0257521 A1 * | 11/2007 | Fallis, III | ............... | B60J 7/0053 296/218 |

(Continued)

FOREIGN PATENT DOCUMENTS

EP    2060425 A1 *  5/2009 .............. B60J 1/183

*Primary Examiner* — Amy R Weisberg
*Assistant Examiner* — Kevin P Weldon
(74) *Attorney, Agent, or Firm* — Warn Partners, P.C.

(57) ABSTRACT

A panel top assembly adapted for a vehicle including a pivotal portion that is rotatable between a closed position and open sunroof position, the pivotal portion is coupled to guide assemblies to selectively slide rearward to another top open position. There is provided a removable hard rear window, a rear hard drip rail; and a pair of removable hard rear side window assemblies on the side of the vehicle that wrap around to the back of the vehicle creating clear rear hard corners and that are also in sealing engagement to the rear window. The rear hard drip rail and pivotal portion selectively drop down at an angle into the rear cargo area of the vehicle when a fully open top experience is desired.

20 Claims, 10 Drawing Sheets

(56) References Cited

U.S. PATENT DOCUMENTS

2015/0115646 A1\* 4/2015 Bowles ................. B60J 7/1265
                                                                    296/107.09
2018/0194207 A1\* 7/2018 Lewis ................... B60J 7/1291
2021/0309084 A1\* 10/2021 Larson ...................... B60J 7/11
2021/0331565 A1\* 10/2021 Haberkamp ............. B60J 7/061

\* cited by examiner

REAR HARD ENCLOSURE FOR A SOFT TOP

CROSS-REFERENCE TO RELATED APPLICATIONS

The instant application is a continuation of U.S. patent application Ser. No. 17/190,075, filed Mar. 2, 2021, which claims the benefit of U.S. Provisional Application No. 62/984,068, filed Mar. 2, 2020. The disclosures of the above applications are incorporated herein by reference.

FIELD OF THE INVENTION

The present invention relates to a hard interaction point for a soft panel top assembly moveable between a closed position and multiple open positions.

BACKGROUND OF THE INVENTION

Providing sunroof or convertible tops for sport utility (SUV) type vehicles is desired. The convertible roof can typically be moved between a closed position and at least one open position. When in the closed position, the convertible roof closes off the roof top opening and protects the occupants of the vehicle from various weather conditions. However, there are occasions where the weather is pleasant, and it is desired by the occupants of the vehicle to move the convertible roof to one of its open positions such that the vehicle essentially functions with a sunroof opening, exposing the front cockpit, or further back without a roof where the vehicle interior is exposed to the atmosphere. This allows the occupants of the vehicle to enjoy more favorable weather conditions.

However, current designs for roof tops do not allow for the assembly to open and drop efficiently at the rear of the vehicle, and do not have the option to rotate down and are bulky—making them difficult to move and taking up a lot of space. They also have limited visibility out of the back of the vehicle. Known tops are rather cumbersome to use and take up too much space when in open positions—which is a significant issue due to the poor aerodynamics and wind drag thereby decreasing fuel efficiency while increasing noise from the assembly. Yet another known issue with conventional systems is lowered visibility due to hard rear corners. Theft deterrents are also desired.

Accordingly, there exists a need for a rear hard enclosure interaction that provides improved visibility, security, and theft deterrent and improvement in controlling the motion of the roof top system roof for the vehicle that is capable of movement between a closed position and a plurality of open positions, including dropped down into the cargo hold area of the vehicle.

SUMMARY OF THE INVENTION

The present invention is directed to a panel top assembly adapted for a vehicle, including, a pair of rear side window drip rails operably interfacing with a pair of hard rear side windows, combined with security (e.g., from theft, smash and grab, etc.) by providing the pair of hard rear side windows that wrap around from the side to the back of the vehicle, interface with a rear window, and are adapted to operably connect to the vehicle—forming a rear hard corner with the added benefit of improved visibility. The wrapping pair of hard rear side windows are transparent or clear, including at the hard rear corners, and the rear window is transparent or clear, and the panels interface with each other and are adapted to selectively connect to the vehicle, all of which improves visibility and security and are significant advantages over conventional systems. A pair of hard rear drip rails operably interface to the pair of hard rear side windows.

The hard rear window and pair of hard rear side windows are selectively removable from the vehicle. An articulating portion of the top panel assembly is selectively moveable to operably move rearward and drop down into an open position into the rear cargo area of the vehicle. In addition, the pair of hard rear drip rails rock rearward bringing the back end to rest in the rear cargo area such that the drip rails are at a predetermined angle when the top panel assembly is in the open position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
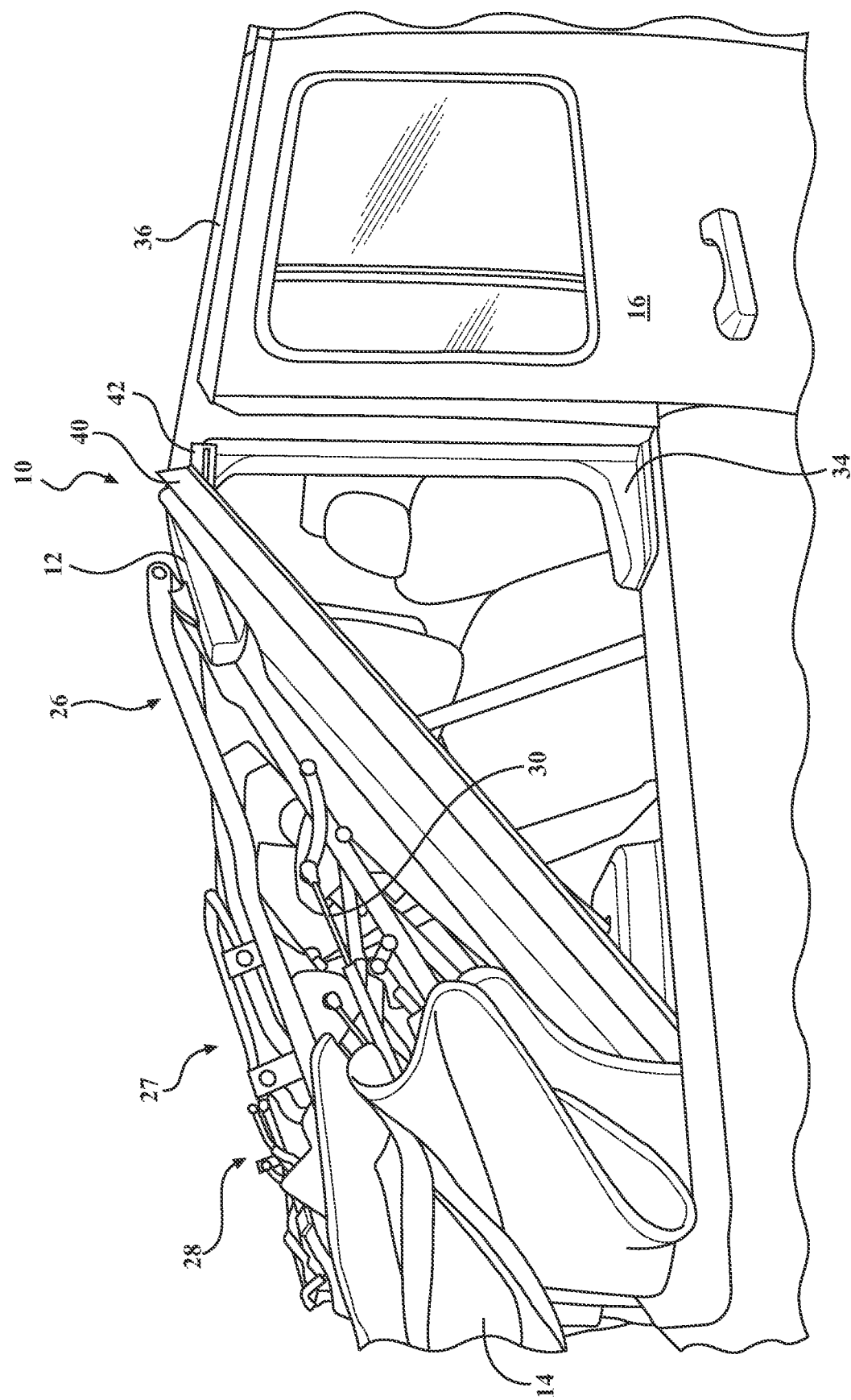
FIG. 1 is a side perspective view of the panel top assembly, in accordance with the present invention.

The following description of the preferred embodiment(s) is merely exemplary in nature and is in no way intended to limit the invention, its application, or uses.

Referring to FIGS. 1-16 generally, a panel top assembly is shown generally at 10, adapted for operably attaching at a roof top opening of a vehicle 16 (e.g., sport utility vehicles), in accordance with the present invention. Most preferably, the panel top assembly 10 is a soft top assembly. The panel top assembly 10 includes at least one guide track system 12 adapted to operably connect to the vehicle 16 and includes at least one cover 14 that selectively closes off the roof top opening. The at least one cover 14 is also selectively openable to a plurality of positions as desired, e.g., to provide a sunroof opening, to provide an open front and rear cockpit, etc.), retractable to another position for a more open air feel, e.g., adapted to angle into vehicle tub 17 area or "cargo area" (FIG. 1); and, optionally, to at least partially selectively collapse down into the tub 17 (e.g., indicated by down arrow in FIG. 2).

It is understood that any other guide track system or any other alternative system suitable for controlling movement of the top assembly 10 between closed and open position(s) is contemplated without departure from the scope of the present invention. It is further understood that any suitable stop(s) and any suitable release mechanism(s) may be used to control how far the top assembly 10 moves in the generally fore-aft directions and to help selectively control movement of the top 10 to a down position and, optionally, selectively releasable to at least partially drop into the vehicle tub 17, as desired.

The figures depict an exemplary vehicle 16 having a roof top opening generally indicated at 24. By way of non-limiting example, the vehicle 16 generally includes a windshield frame header with side members (e.g., vehicle roll bar or sport bars) extending generally therefrom and at least one cross member connecting the side members substantially adjacent the rear of the front cockpit compartment. There are depicted a plurality of sport bars on the vehicle, including rear sport bar 20. The rear sport bar 20, for example, can include substantially horizontal upper segment integral with an angled rearward segment that angles downward in the direction toward the tailgate of the vehicle. The sport bars of the exemplary vehicle 16 generally are adjacent a forward, front cockpit portion, rearward, rear cockpit portion, and rear most, cargo area portion. It is understood that the present invention is adaptable for any predetermined vehicles.

Preferably, each guide track system 12 is adapted to operably connect to at least one respective sport bar, most preferably, to at least opposing rearward sport bars. It is understood, however, that the guide track system 12 is adaptable to connect to any predetermined vehicle structure or part suitable for selectively guiding the panel top assembly 10 between open and closed positions without departure from the scope of the present invention.

It is understood that the panel top assembly 10 of the present invention is operably adaptable for any roof top opening depending on the application without departure from the scope of the present invention. It is understood that the panel top assembly 10 is suitably adaptable for interaction with any alternative vehicle structure.

The top assembly 10 also includes an operably moveable frame assembly, shown generally at 26, that includes a pivotal portion, shown generally at 28. The pivotal portion 28 preferably has a plurality of linkage assemblies, indicated generally at 27 operably to selectively rotate the top between a closed position and at least one open position. The moveable frame 26 is operable to selectively slide to at least one additional open position (e.g., slid rearward in the direction to the back of the vehicle and then rotated to angle down into the tub 17).

Figure 10:
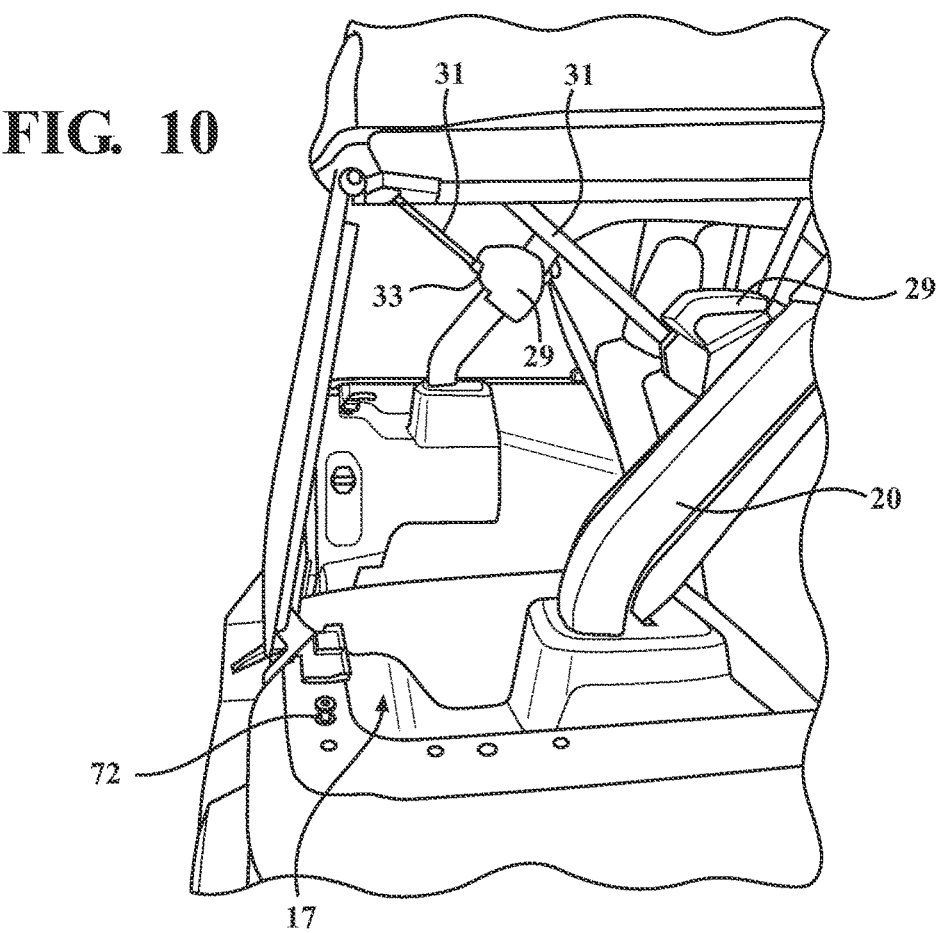
FIG. 10 is a is a rear corner perspective view of the panel top assembly of the present invention.
Figure 11:
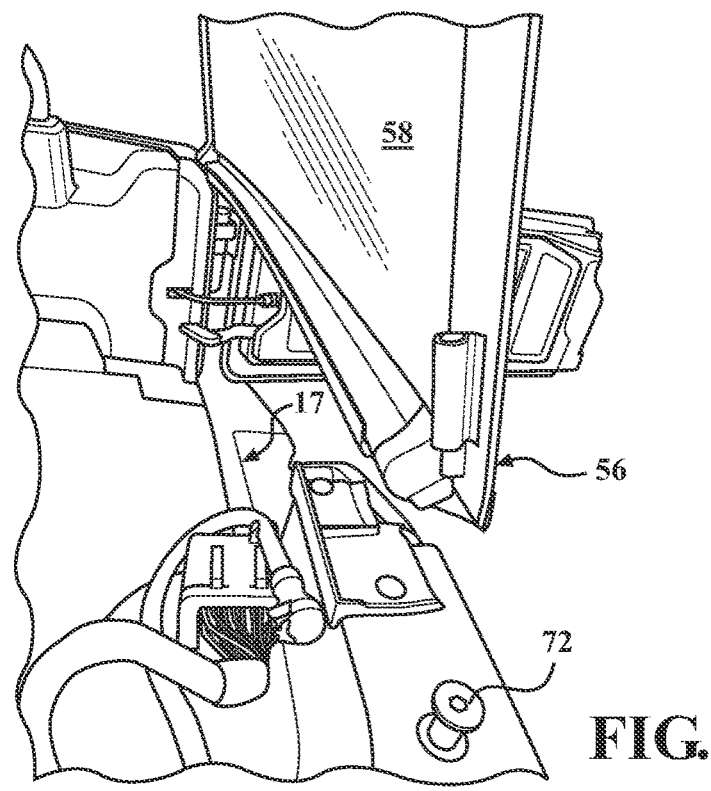
FIG. 11 is a detailed perspective view of the latching attachment of the panel top assembly of the present invention.
Figure 12:
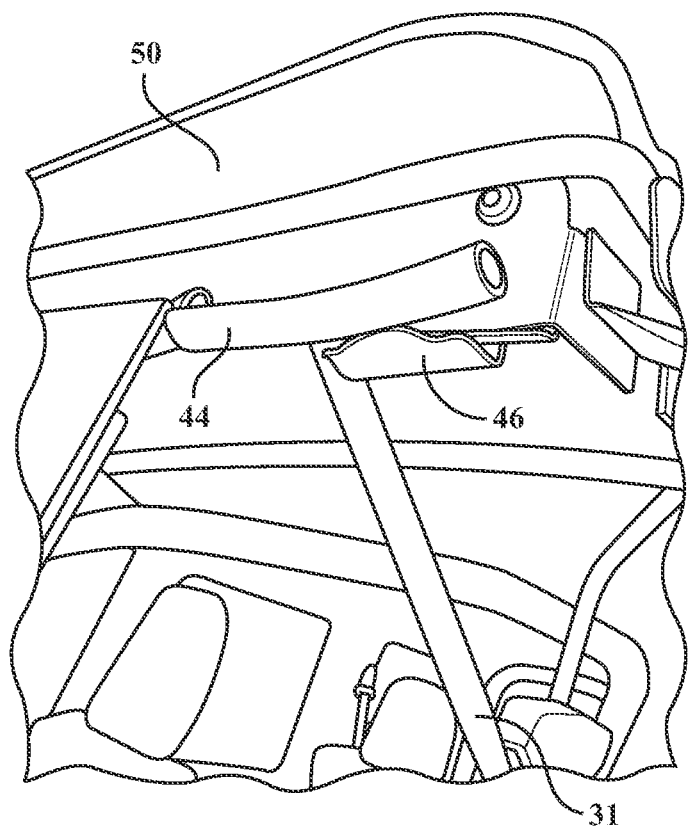
FIG. 12 is a detailed rear view of the panel top assembly of the present invention.
Figure 13:
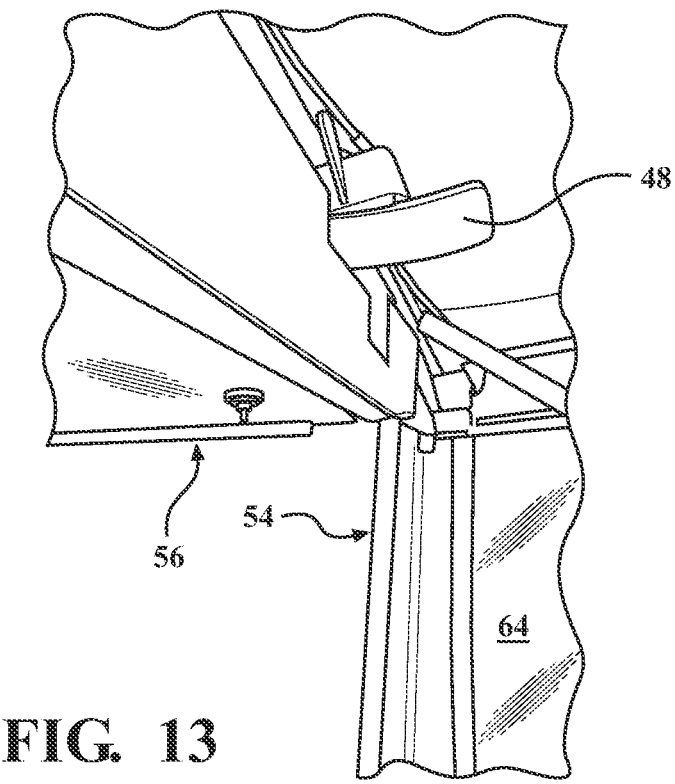
FIG. 13 is a detailed perspective view of a rear latching assembly of the panel top assembly of the present invention.
Figure 14:
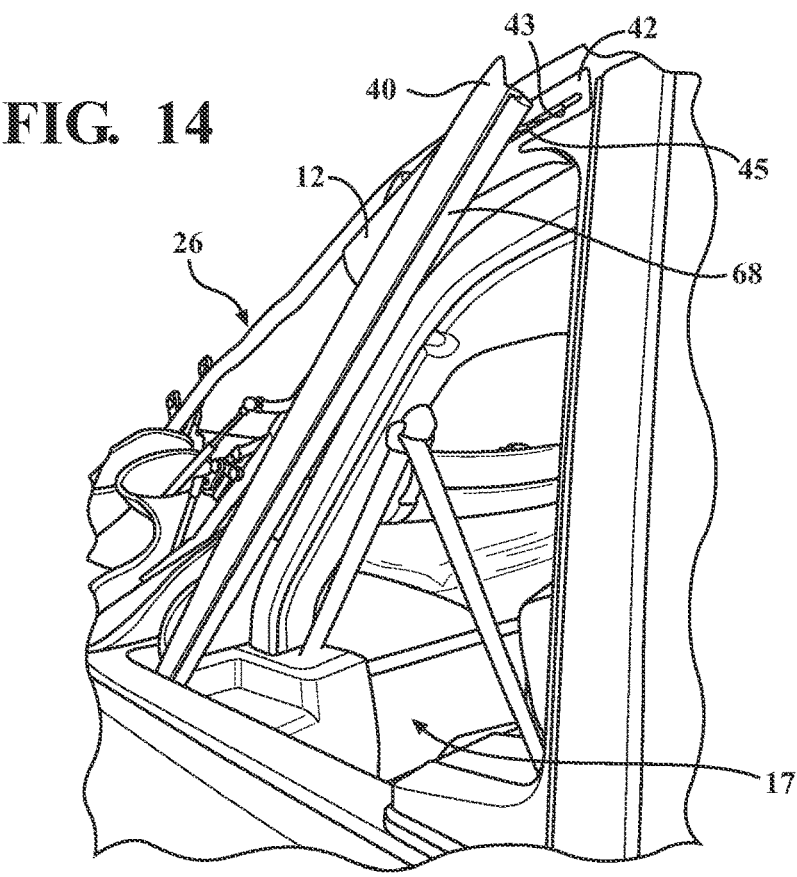
FIG. 14 is rear side perspective view of the panel top assembly of the present invention in an open position.
Figure 15:
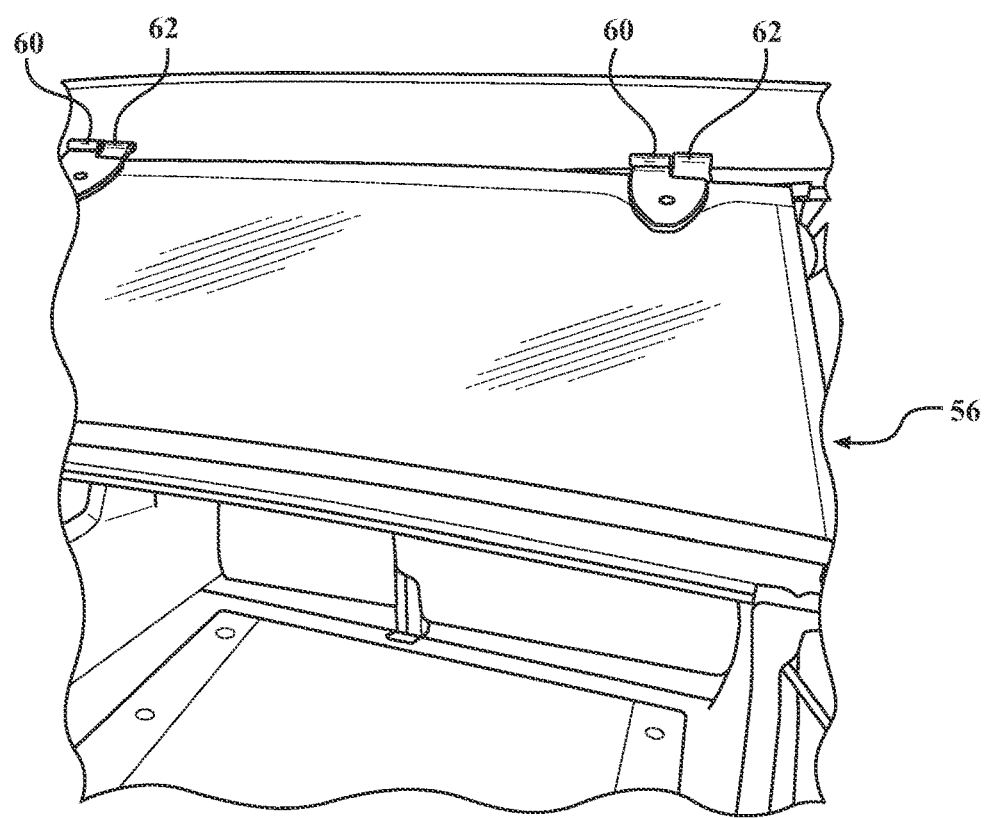
FIG. 15 is a rear view showing a hinge and attachment of the rear window of the panel top assembly of the present invention.
Figure 16:
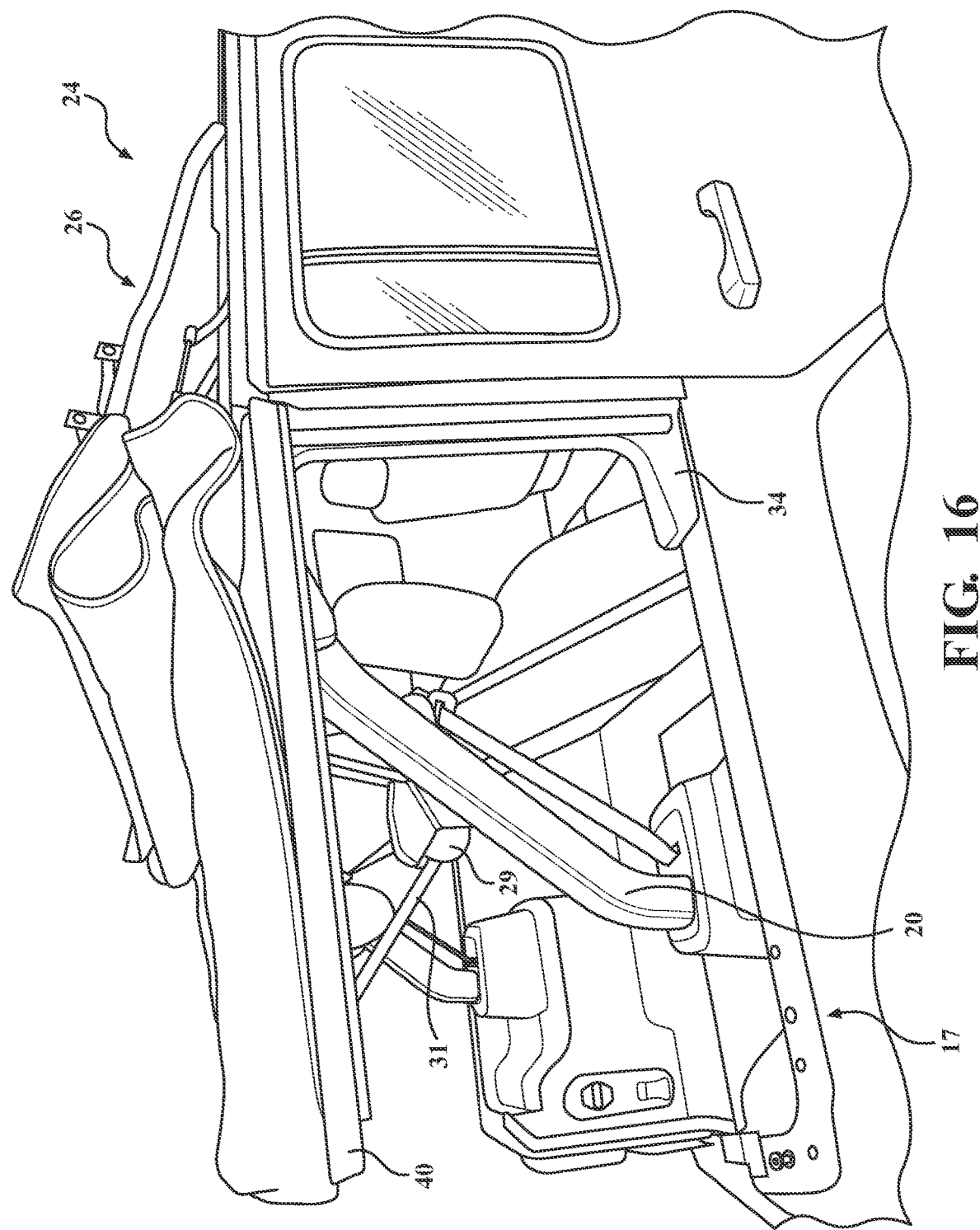
FIG. 16 is a side view showing the panel top assembly of the present invention.

At least one lift assist mechanism, preferably, at least one pair of rear list assist mechanisms 29, 29 are provided (e.g., see FIG. 10). The at least one lift assist mechanism 29 is adapted to operably connect to the vehicle 16, most preferably, on the rear sport bar 20 that is angled into the vehicle tub 17. When in a locked position, each lift assist mechanism 29 holds at least one upright bow 31 of the panel top assembly 10 in a predetermined position to hold the rear of the panel top assembly 10 in an up position (FIG. 16). The at least one lift assist mechanism 29 incorporates a latch release 33 operable to selectively release the mechanism (e.g., internal cam) of the lift assist mechanism 29 holding the top up to allow an operator to rotate the rear of the panel top assembly 10 down into the vehicle tub 17 (FIG. 1). Once rotated down, the panel top assembly 10 rests in the tub 17, allowing for an open air driving experience. It is understood that the lift assist mechanism 29 is adapted to connect to any suitable predetermined vehicle structure depending on the particular application, e.g., sport bar, D-pillar, rear frame, rear panels, rear fenders, tub, rear cargo area, etc., without departure from the scope of the present invention.

It is understood that the top assembly 10 is adaptable for any linkage assembly 27 arrangement suitable for moving between at least a closed position and generally open sunroof position. By way of non-limiting example, the panel top assembly 10 includes a plurality of bows (e.g., front header, tensioning bows, fabric management bows, etc.). The cover 14 is operably connected to at least the moveable frame portion 26 adapted to close off the roof top opening 24. In accordance with an aspect of the present invention, optionally, gas cylinders 30, 30 and control linkages assist with lifting and controlling motion of the pivotal portion 28.

The panel top assembly 10 is operable to move the pivotal portion 28 between a closed position (e.g., to close the roof opening of the vehicle) and at least one open position or "sunroof" position to uncover the roof top opening of the vehicle (e.g., uncover generally the front cockpit of the vehicle and, depending on the particular application, generally the rear cockpit of the vehicle). Additionally, the assembly 10 is slidable to move the moveable frame assembly 28 between the open sunroof position and a plurality of top down positions to create further open air experiences.

Optionally, at least one lock mechanism is provided, e.g., with a quick release detent, tongue and loop straps, etc. or any other mechanism suitable to prevent the moveable frame assembly 26 from sliding rearward when in the open sunroof position, until desired. Preferably, at least one limiting stop is provided to set the predetermined height of the pivotal portion in the open sunroof position.

According to aspects of the present invention, the top panel assembly 10, includes at least one pair of door rail assemblies, shown generally at 32. The first door rail 32 is adapted to operably connect to the vehicle at the roof top opening 24 (e.g., adjacent the front vehicle doors). The pair of first door rails 32, 32 are adapted to operably connect to a predetermined part of the vehicle 16 in a generally fore/aft direction, preferably, adapted to operably connect to the right hand/left hand sport bars. Most preferably, the pair of first door rails 32, 32 are front door rails connected adapted to connect to the front portion sport bars of the vehicle 16.

The pair of first door rails are adapted to provide a watertight seal with the cover 14 of the top assembly 10 when in the closed position. Preferably, the pair of first door rails are also adapted to provide a watertight seal against the vehicle doors, e.g., front doors. Alternatively, no front door rails 32 or alternative door rails are used depending on the application without departure from the scope of the present invention.

According to aspects of the present invention, the top panel assembly 10 includes at least one pair of second door rails 34 adapted to operably connect to the vehicle, e.g., to opposite sport bars of the vehicle and/or any other suitable vehicle part or frame generally adjacent to a predetermined vehicle pillar, e.g., B pillar, C-pillar, etc. Preferably, generally vertical second door rails 34 adjacent the vehicle tub 17, e.g., adjacent the generally vertical edge of the vehicle door, adjacent the rear door of the 4-door vehicle, etc.). At least one door panel vertical rail 34, e.g., generally vertical portion, is adapted to operably attach adjacent to a vehicle door opening or adjacent a pillar area of the vehicle, e.g., a generally downward depending portion connected, e.g., by at least one fastener, generally at the vehicle sides behind passenger seating, preferably, to a C-pillar of the vehicle behind rear row passenger seating. Alternatively, with a 2-door vehicle, generally behind the front row seating. It is understood that any predetermined combination of the door rails are separate pieces (e.g., two to three parts) or integrally formed together.

According to an aspect of the present invention, a pair of third door rails 36 are adapted to connect to a predetermined part of the vehicle 16. Most preferably, the third door rails 36 are rear door rails adapted to connect to the vehicle adjacent a door opening, e.g., adapted to connect to rearward portion sport bars of the vehicle 16 in a generally fore/aft vehicle direction generally adjacent the rear door of a 4-door vehicle. The pair of third door rails 36 are adapted to provide a watertight seal with the cover 14 of the top assembly 10 when in the closed and open sunroof positions. Preferably, the pair of second door rails 36 also are adapted to provide a watertight seal against the vehicle doors, e.g., rear doors. Alternatively, no rear door rails 36 or alternative door rails are used depending on the application without departure from the scope of the present invention.

The guide track system 12 on both interior sides preferably includes a generally C-shaped guide track 13 (see FIG. 9) embedded as part of at least the rear door rail 36, the guide track 13 receiving a corresponding feature of the top movable frame 26, e.g., at least one guide roller in each C-shaped guide track, operable to selectively slide the top 10 fore/aft between the closed and open positions. The top panel assembly 12 operably pivots at this point, generally indicate at 15, adapted to angle the movable frame 26 down into the vehicle tub 17. It is understood that, alternatively, the guide track system 12 with shaped guide track incorporates a separate extrusion, metal track, aluminum track, etc. adapted to operably connect to the vehicle. It is further understood that a stop may be incorporated that operably selectively releases, e.g., thumb release 41, to allow the moveable frame 28 to be selectively slid rearward and angled into the tub 17.

Each pair of door rails 32, 34, 36 is an integrated single piece or multiple pieces operably connected together depending on the application without departure from the scope of the present invention. It is further understood that the front and rear door rails 32 and 36 are a single piece integrated pieces or multiple pieces operably connected together depending on the application without departure from the scope of the present invention. Preferably, the door rails 32, 34 and/or 36 are formed of a molded material, e.g., lightweight molded material. Other materials are contemplated without departure from the scope of the present invention. It is understood that the door rails 32, 34 and/or 36 are operably adaptable (e.g., shape, length, width, height, material, etc.) to the vehicle depending on the application, e.g., four door vehicles and two door vehicles, SUVs, mid-sized SUV, truck-based SUV, any body style vehicle, etc., without departure from the scope of the present invention.

Figure 2:
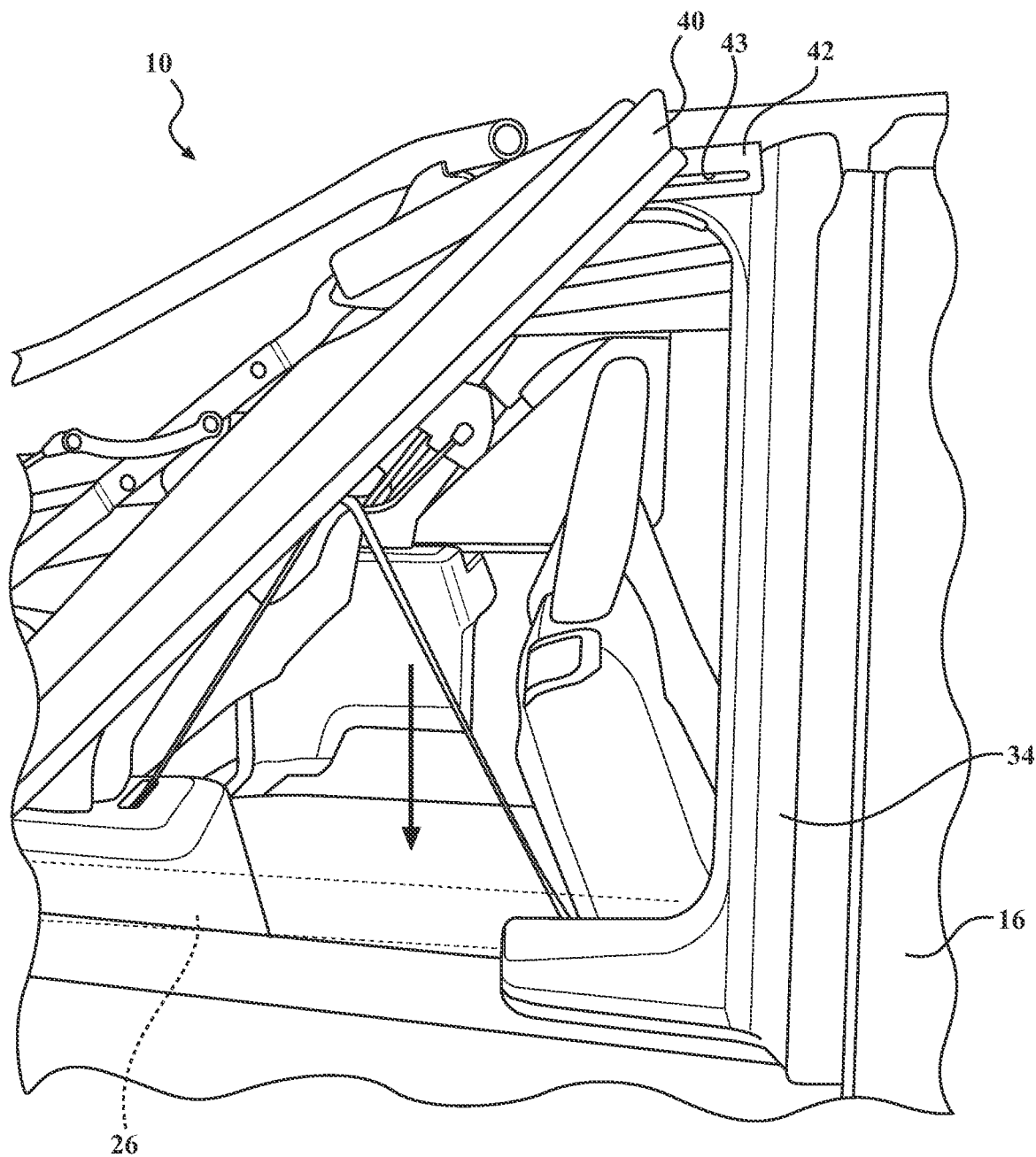
FIG. 2 is a detailed perspective view of the panel top assembly of FIG. 1 showing the folding feature of the panel top assembly of the present invention.
Figure 3:
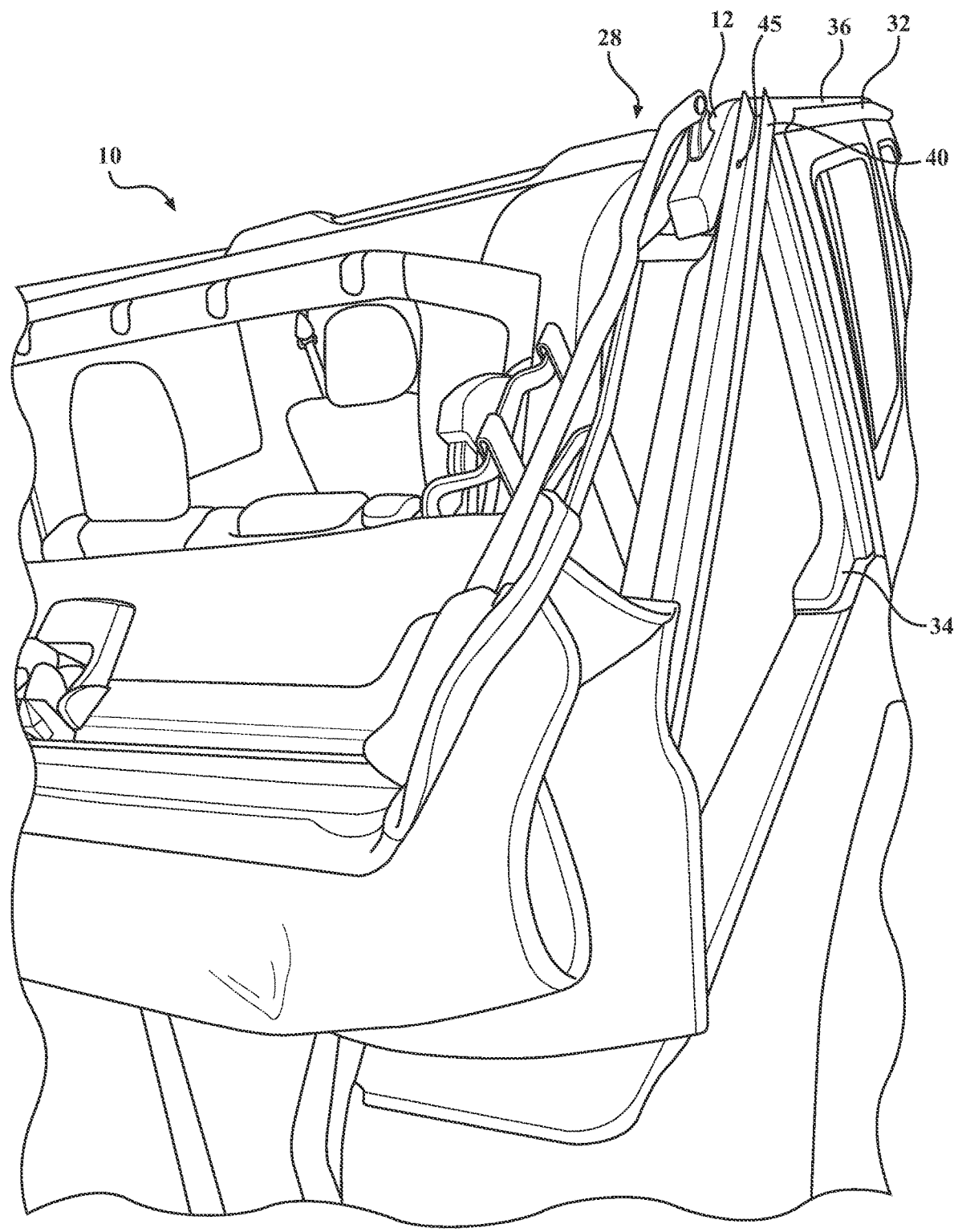
FIG. 3 is rear perspective view of the panel top assembly of the present invention.
Figure 4:
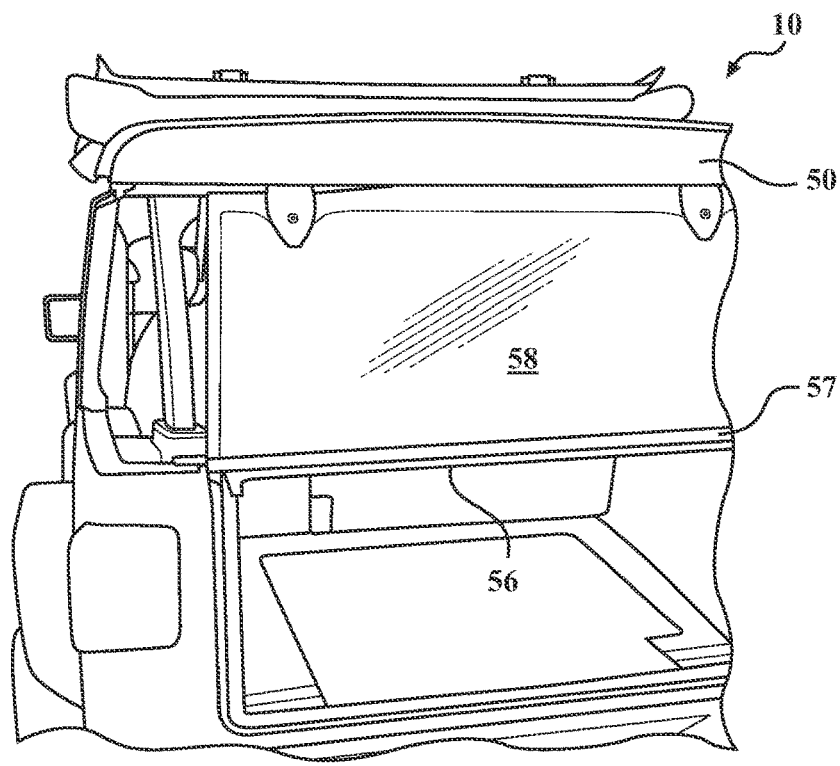
FIG. 4 is a rear view of the panel top assembly of the present invention.
Figure 5:
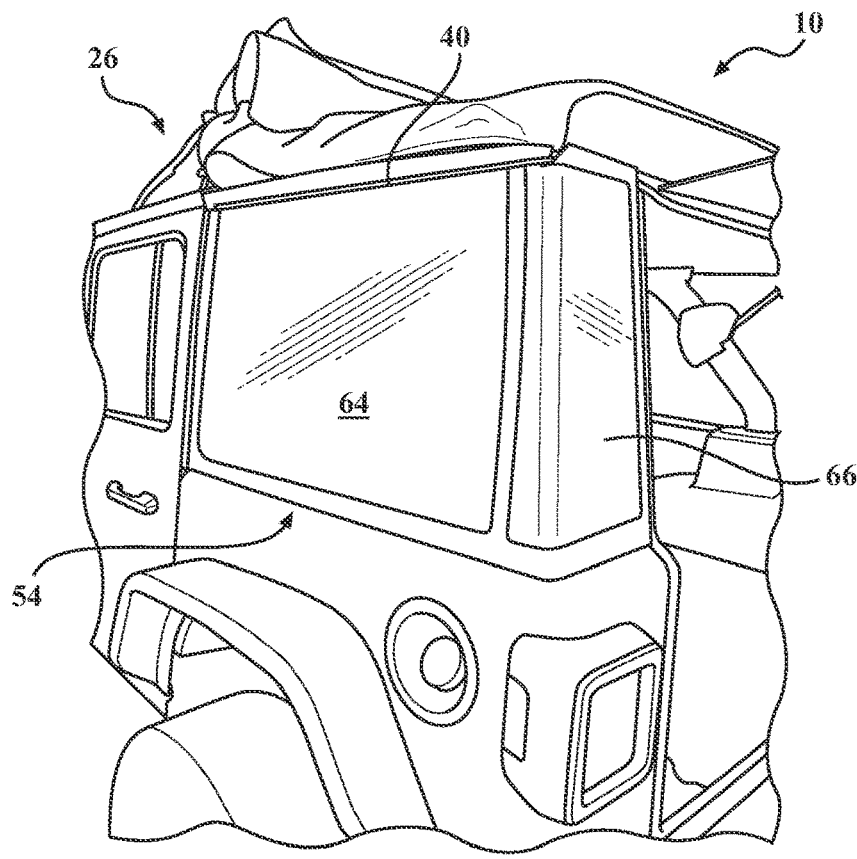
FIG. 5 is a left side perspective view of the panel top assembly of the present invention.
Figure 6:
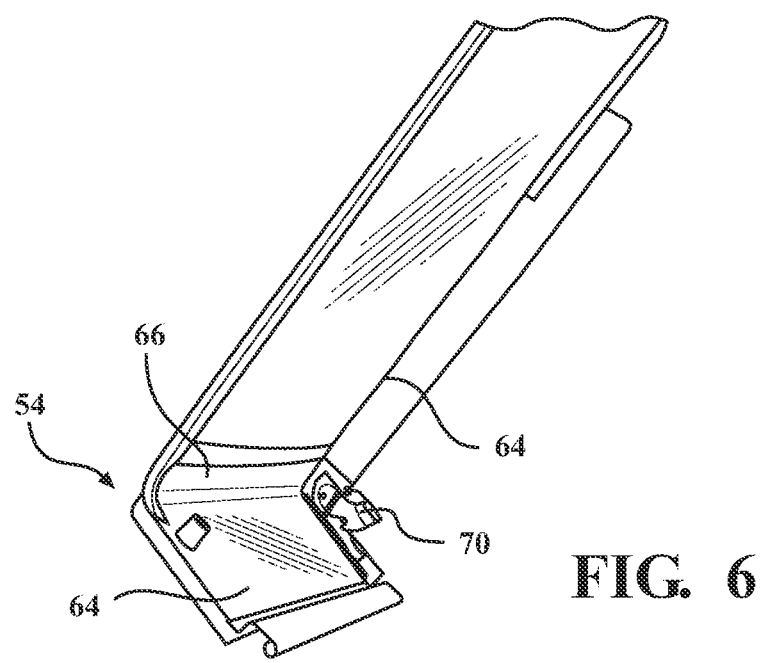
FIG. 6 is a top perspective view of a removable side window assembly of the present invention.
Figure 7:
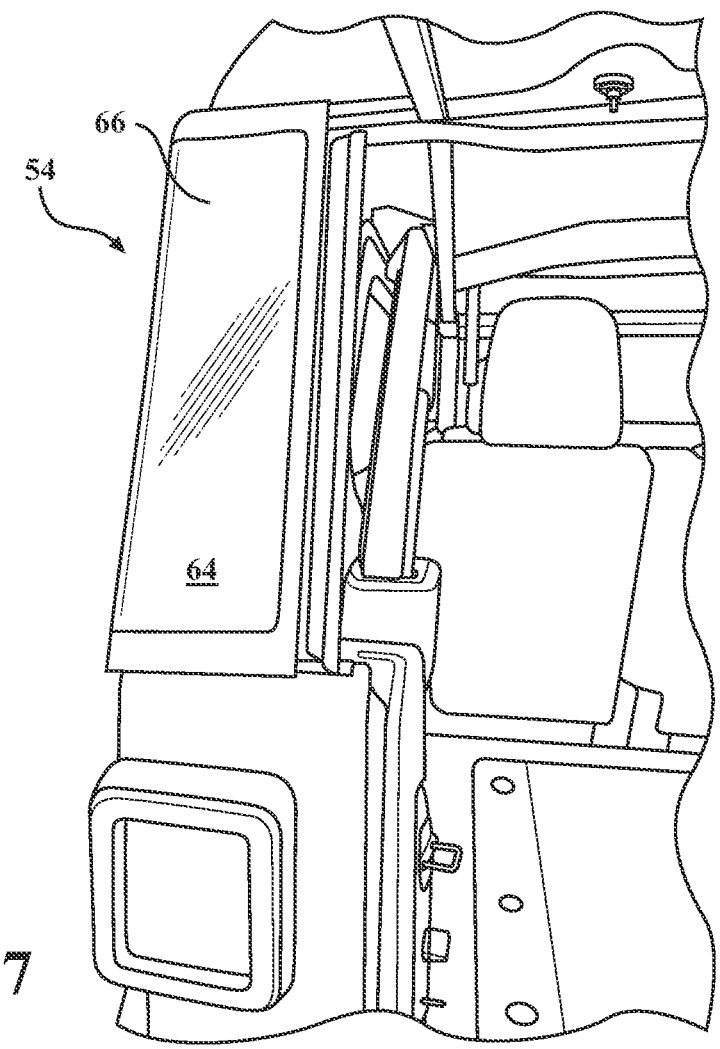
FIG. 7 is a rear perspective view of the removeable side window panel assembly in place on the exemplary vehicle, in accordance with the present invention.
Figure 8:
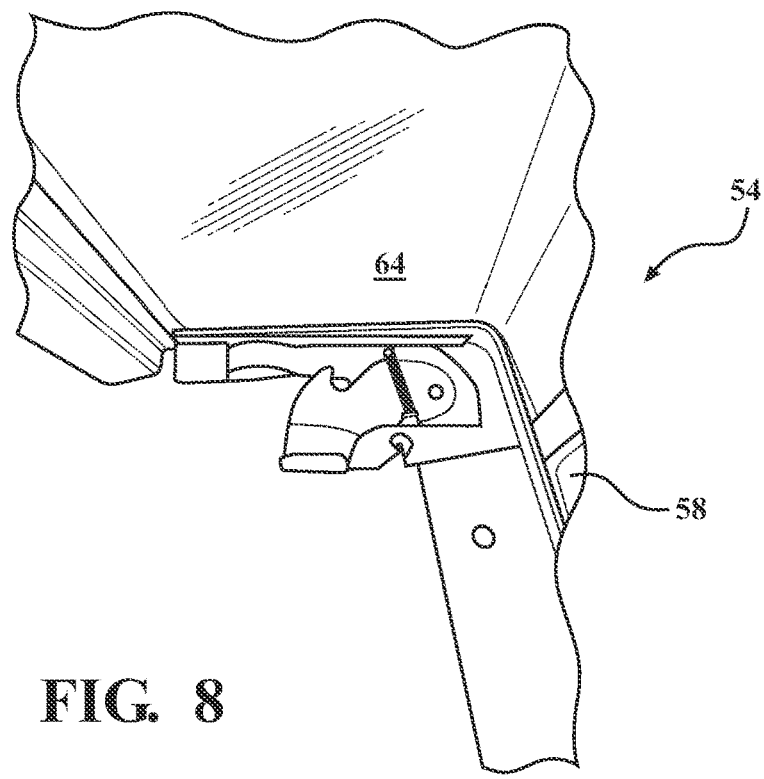
FIG. 8 is an inside detailed perspective view of the removeable side window assembly showing the securement latch for latching of the side window to the vehicle, in accordance with the present invention.
Figure 9:
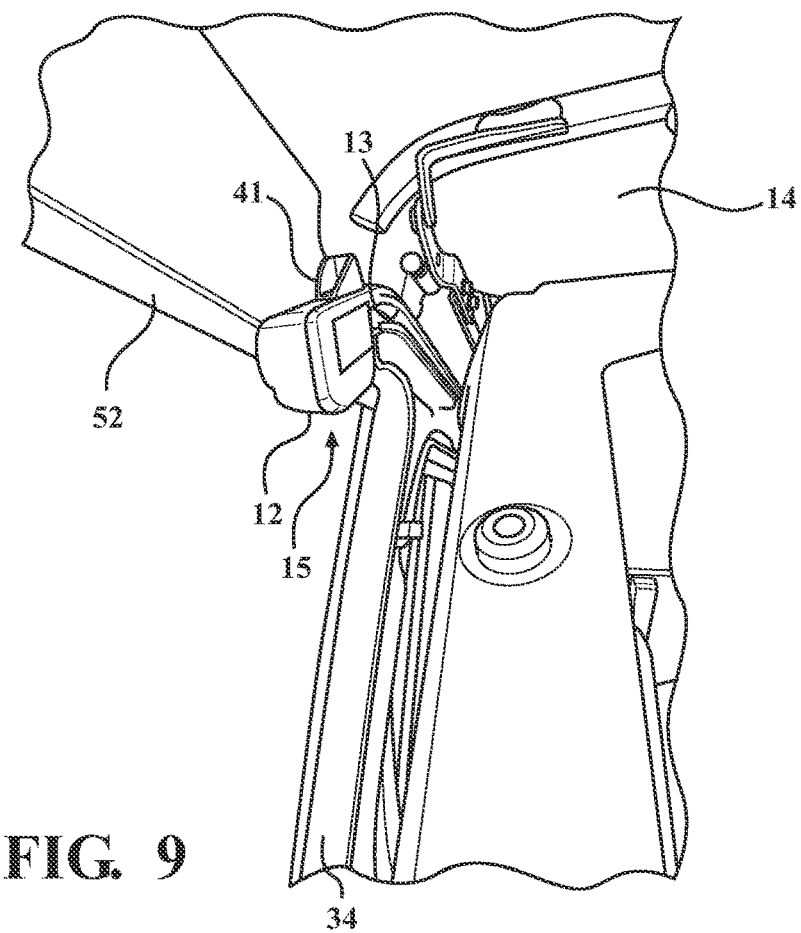
FIG. 9 is an inside corner perspective view of the panel top assembly of the present invention.

In accordance with the present invention, there is provided a rear side window drip rail 40 ("drip rail") that provides a hard interaction point of the panel top assembly 10. The rear side window drip rail 40 is a substantially horizontal drip rail that can be selectively moved rearward to drop the back end into the vehicle tub 17 at a predetermined angle. FIG. 1 depicts the rear of the drip rail 40 dropped down and touching off on the vehicle 16 such that the pivotal portion 28 of the system 10 is also dropped down (e.g., when the latch mechanism 29 is released. The drip rail 40 touches off at a predetermined location in the tub 17 such that the system is at a predetermined angle. It is understood that FIG. 2 illustrates a further drop down of the movable frame 2, in accordance with optional alternative open positions, to bring the entire pivotal portion 28 into the tub 17, e.g., when a thumb release 41 operably disengages rollers from the C-shaped track, without departing from the scope of the present invention.

A slotted bracket 42 is adapted to operably connect to the vehicle 16, e.g., a metal or molded bracket, plate, plate with a key slot, plate with a bracket portion connected to the vehicle with at least one faster. The slot 43 receives and holds a pin 45 of the drip rail 40 that translates along a slotted plate 42. The panel top assembly 10 is rocked generally rearward with the pin 45 in the slot 43 and the rear drip rail 40 angled down to the vehicle tub 17. The panel top assembly 10 rests in the tub 17 at a predetermined angle, e.g., about at least 45 degrees, the movable frame at about 15 to 75 degrees, 15 to 45 degrees, etc. It is understood that any carrier coupled to the rear drip rail 40 suitable to translate in a corresponding slot, or alternative suitable feature, to bring the rear drip rail 40 generally downward to the angled position and generally upward to the horizontal position is contemplated without departure from the scope of the present invention.

Preferably, the rear lift assist(s) 29 includes the lock, e.g., biased, selectively releasable cam lock, holding the rear upward standing bow 31 and at least one rear bow 44 (e.g., cross car bow) attached thereto in an up position (FIG. 16). The drip rail 40 is preferably operably coupled to the upward standing bow 42, and/or rear bow 44, e.g., by a bracket 46 operably coupled to the top deck, thereby holding the drip rail 42 preferably generally horizontal (e.g., when the assembly 10 is in the closed or sunroof positions; extending generally in a fore/aft direction of the vehicle). Selectively actuating a release mechanism 48, e.g., a paddle latch operably coupled to the release device 33 on one or both of the lift assist(s), etc. such as by at least one cord extending from the paddle latch 48 to the lift assist mechanisms 29, 29, allows the lift assists 29 to operably "unlock" to allow generally rearward/downward rotation of the upward bows 31, at least one rear bow 44, and cover 14, also drawing the end of the drip rail 40 down into the tub 17. Alternatively, the drip rail 40 is operably arranged independently. It is understood that any alternative suitable rear tensioning of the top and holding of the drip rail 40 preferably substantially horizontally is contemplated depending on the application without departure of the scope of the present invention.

In accordance with the present invention, there is provided a hard rear side window shown generally at 54 and a hard rear window shown generally at 56.

The rear window 56 includes a hard panel 58 of at least one predetermined material, e.g., glass, polycarbonate, acrylic, etc. At least one fastener arrangement is provided adapted to operably attach the rear window 56 to the vehicle. Preferably, a pair of pins 60 and slots, pockets, or aperture arrangements 62 where each pin 60 slides in and is held in the respective aperture 62 of the corresponding fastener. One of the pins 60 or fasteners with aperture 62 is adapted to operably attach to the vehicle 16 or the rear window 56, and the other of the pin 60 or fastener 62 is adapted to attach to the other of the vehicle 16 or rear window 56. Selectively sliding the pins 60 out of the apertures 62 allows the rear window 56 to be removed from the vehicle. Alternatively, a P-welt or other shaped weld is provided that slides into a corresponding shaped feature to secure the rear window 56 to the vehicle, e.g., adapted to secure the top window edge to the vehicle. The bottom of the rear window 56 is adapted to operably connect to the vehicle 16. Preferably, a tow bar 57 operably connected to the hard panel 58 is adapted to selectively connect to the vehicle 16 adjacent the rear window opening.

A rear top deck 50 of the cover 14 at least partially overlays the rear window 56 attachment of the panel top assembly 10. A side deck 52 of the cover 14 optionally at least partially overlays the rear drip rail 40 of the panel top assembly 10, preferably, an inward, longitudinal sidewall of the rear drip rail 40, leaving the outward sidewall exposed. Preferably, a fore/aft running cable coupled to the cover 14 or another tensioning device tensions the cover 14, e.g., against all the drip rails, against the vehicle, against the inward sidewall of the rear drip rail 40, etc.

The rear side window 54 is a hard rear side window formed of at least one panel 64 that extends from the side of the vehicle 16 and wraps around to the rear, forming a hard rear corner 66 that can be substantially seen through. The rear side window 54 operably seals to the rear window 56. The window 64 includes glass, polycarbonate, acrylic, SMC injection mold, composite, SMC component wrapped around the edge, or any suitable material.

The rear side window drip rail 40 is adapted to locate adjacent to the top side deck line and the rear side window 54 operably interfaces with the drip rail 40 and is adapted to operably lock into place on the vehicle 16. Preferably, the drip rail 40 is in operable sealing engagement with the rear side window 54. Preferably, a seal 68 is operably connected on a surface of the drip rail 54, e.g., on at least one longitudinal, bottom surface, providing a weathertight seal against the rear side window 54.

The rear side window drip rail 40 in combination with 360 degree security (e.g., from theft, smash and grab, etc.) by adding the hard rear side window 54 that wraps around also forming a vertical rear hard corner, and the rear window 56, all of which also improves visibility, are significant advantages over conventional systems. These panels are also removable—hard rear side window 54 and rear window 56 are selectively removable from the vehicle.

An onboard security alcove for the window panels and other components is also contemplated depending on the application without departure from the scope of the present invention. By way of non-limiting example, storage in the tub area 17 of the vehicle for the rear side window 54 and/or rear window 56. The rear side window 54 operably fastens to the vehicle, e.g., to the door rail 36 and the tub 17 wall, etc. Preferably, a rotating door latch 70, e.g., on a lower corner of the rear side window panel 54, is adapted to hit a striker 72 on the vehicle—and latches onto the striker 72. The striker 72 is generally located on top of the tub 17 walls at both rear corners. The latch 70 is operably adapted to selectively be opened, from the vehicle interior side, to remove from the striker 72 hold when removing the rear side window 54 is desired.

To drop the top panel assembly 10 down, first the rear side windows 54 and rear window 56 are removed (or operably rotate and store the rear window in a horizontal position whether or not still attached at hinge points), the pivotal portion 28 is rotated to a sunroof position, then the soft top guide tracks operably allow the movable frame 26 of the top to be slid rearward, the latch mechanism 29 released and the movable frame 28 rotated downward to the tub 17 as the drip rail 40 pin 45 rocks rearward in the key slot 43 bringing the drip rail 40 down to the tub 17 and the system is angled down into the tub 17 at a predetermined angle or at least partially dropped down further into the tub 17. The pivotal portion 28 is adapted to operably connect to the vehicle when closing the top is desired. Preferably, latches on a front tensioning bow selectively connect at a windshield frame of the vehicle in the closed position. Releasing these latches then allows the pivotal portion 28 to be rotated back, at least partially uncovering the roof top opening of the vehicle.

According to an aspect of the present invention, the rear side window 54 must be removed so that the drip rail 40 can drop down into the tub 17 and not hit the window 54.

The present invention provides a removable hard corner, which is a significant advantage.

The present invention provides a rear side window 54, which is a significant advantage.

The present invention provides a rear side window 54 that wraps around to the back of the vehicle 16, which is a significant advantage.

It is contemplated that at least one release point can be provided on the drip rail 40, e.g., a mid-way release point, hinge, etc., for a slant back top soft top assembly. The assembly 10 is otherwise adaptable for providing a slanted back when closed and also drop down at a predetermined angle into the tub 17 when desired.

While a generally vertical pair of rear corner enclosures or rear enclosure regions is depicted, it is understood that the top assembly 10 is operably adaptable to provide a slanted back at any predetermined angle depending on the application without departure from the scope of the present invention, e.g., 15-50 degrees from vertical, at least about 45 degrees, etc. By way of example, the predetermined maximum angle is limited to that required to clear the rear sport bar 20 that is angled.

According to aspects of the present invention, the panel top assembly includes a controlled guide roller management system and install/release mechanism. A pivotal portion, that is rotatable between a closed position and open position, is coupled to guide assemblies slidably connected to guide track assemblies. A removable rear window; a rear drip rail; and a pair of removable rear side window assemblies on the side of the vehicle that wrap around to the back of the vehicle and seal to the rear window. The rear drip rail and pivotal portion drop down at an angle into the tub of the vehicle at a rear edge when desired.

It is understood that the left side of the panel top assembly 10 is preferably a substantially mirror image to the right side depicted in the figures.

While a 4-door vehicle is illustrated, it is understood that the present invention is adaptable for a 2-door vehicle, 2 or 4-door SUV with extended cargo area, and any other vehicle, without departure from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A panel top assembly adapted for a vehicle, comprising:
    a frame adapted to operably connect at a roof top opening of the vehicle, said frame including a pivotal portion operable to selectively rotate between a closed position closing off the opening of the vehicle and at least an open sunroof position;
    at least one pair of rear rails; and
    a pair of removable rear side window assemblies adapted to selectively connect to the vehicle and operably interface with said at least one pair of rear rails, said pair of removable rear side window assemblies forming substantially transparent rear corners;
    wherein said at least one pair of rear rails and said frame are adapted to selectively drop down into a rear cargo area of the vehicle when another open position is desired.

2. The panel top assembly of claim 1, further comprising at least one pin connected to each rear rail, said at least one pin received in a slot of the panel top assembly, wherein said at least one pin in the slot creates a top pivot location allowing the at least one pair of rear rails to selectively rock rearward with the at least one pin in the slot to bring a back end of said at least one pair of rear rails down to said rear cargo area at a predetermined angle for said at least one pair of rails.

3. The panel top assembly of claim 1, wherein each rear rail is operably held substantially horizontal when said panel top assembly is in said closed position or open sunroof position.

4. The panel top assembly of claim 1, wherein said at least one pair of rear rails and said frame are adapted to selectively drop down into the rear cargo area of the vehicle at a predetermined angle of at least about 45 degrees.

5. The panel top assembly of claim 1, further comprising a bracket adapted to operably couple to the vehicle, said bracket including a key slot to receive a carrier for each rear rail operable to transition each rear rail between a predetermined angle position and a substantially horizontal position.

6. The panel top assembly of claim 1, further comprising at least one pair of guide track assemblies adapted to operably connect to the vehicle, said frame operably slidably coupled to said at least one pair of guide track assemblies.

7. The panel top assembly of claim 1, further comprising at least one seal operably connected to each of said rear rails, said at least one seal in sealing engagement with said pair of removable rear side window assemblies.

8. The panel top assembly of claim 1, wherein said pair of removable rear side window assemblies are in sealing engagement with a rear window.

9. The panel top assembly of claim 1, wherein said pair of removable rear side window assemblies are adapted to connect to the vehicle such that each rear side window assembly wraps around from a side of the vehicle to the back of the vehicle to operably interface with a rear window.

10. The panel top assembly of claim 1, wherein said pair of removable rear side window assemblies each include at least one substantially clear hard panel and wraps around at the rear corner to provide an integrated rear side window, rear corner window, and rear window area that is substantially clear for visibility out of the rear corner region of the vehicle.

11. The panel top assembly of claim 1, wherein said pair of removable rear side window assemblies include hard substantially clear window surfaces extending substantially from a substantially vertical side door rail to a hard rear window allowing for visibility through said pair of removable rear side window assemblies.

12. The panel top assembly of claim 1, wherein said pair of removable rear side window assemblies include a corner latch adapted to operably connect to a striker on the vehicle.

13. The panel top assembly of claim 1, further comprising a pair of lift assists adapted to operably connect to the vehicle, said pair of lift assist mechanism holding said frame in a substantially horizontal, up position, and said pair of lift assist mechanisms including at least one release mechanism to allow said frame to be selectively rotated downward into the cargo area of the vehicle to come to rest at a predetermined angle.

14. The panel top assembly of claim 1, further comprising at least one removable hard rear window and at least one pair of fasteners operably adapted to connect the hard rear window to the vehicle.

15. The panel top assembly of claim 1, further comprising a hard rear window that is selectively removable and at least two pins operably connected to said hard rear window or adapted to operably connect to the vehicle, and at least two fastener members operably connected to the other of either said hard rear window or adapted to operably connect to the vehicle, wherein said at least two pins are selectively slidably received and held within said at least two fastener members adapted to selectively connect said hard rear window to the vehicle.

16. The panel top assembly of claim 1, further comprising at least one pair of guide tracks embedded into molded door rails adapted to operably connect to the vehicle, said frame operably slidably coupled to said at least one pair of guide tracks to selectively slide said frame between said closed position and an open position.

17. A panel top assembly adapted for a sport utility vehicle, comprising:
    a moveable frame adapted to operably connect at a roof top opening of the vehicle, said moveable frame including a pivotal portion operable to selectively move between a closed position closing off the roof top opening of the vehicle and adapted to selectively couple to the vehicle and an open sunroof position;
    a removable hard rear window adapted to selectively connect to the vehicle;
    a pair of rear rails; and
    a pair of removable hard rear side window assemblies adapted to selectively connect to the vehicle and interface with said pair of rear rails, said at least one pair of removable hard rear side window assemblies wrap around from sides of the vehicle to a back of the vehicle and are adapted to operably seal to said hard rear window;
    wherein said pair of rear rails and said frame are adapted to selectively drop down into a tub of the vehicle at predetermined angles when a more open position is desired.

18. The panel top assembly of claim 17, wherein said pair of removable hard rear side window assemblies include a latch adapted to operably connect to a corresponding feature of said rear cargo area of the vehicle.

19. The panel top assembly of claim 17, further comprising a plate adapted to operably couple to the vehicle, said plate including at least one slot to slidably receive at least one pin of the pair of rear rails for each rear rail to be operably rocked rearward and downward to said predetermined angle in a panel top assembly open position and moved forward and upward to a substantially horizontal position for said open sunroof position or said closed position.

20. A panel top assembly adapted for a sport utility vehicle, comprising:
- a frame adapted to operably slidably connect at a roof top opening of the vehicle;
- a pivotal portion operable rotatably connected to said frame, said pivotal portion selectively rotatable between a closed position with the pivotal portion adapted to selectively couple to the vehicle closing off the roof top opening, and selectively rotatable to an open position at least partially opening up the roof top opening;
- a removable hard rear window adapted to selectively connect to the vehicle;
- a pair of hard rear rails; and
- a pair of removable hard rear side window assemblies that are substantially clear and adapted to selectively connect to the vehicle and being in sealing engagement with said pair of hard rear rails, said pair of removable hard rear side window assemblies wrap around from opposing sides of the vehicle to the back of the vehicle each creating a hard rear corner and abutting against said hard rear window;
- wherein said pair of hard rear rails and said frame are adapted to selectively drop down into a tub of the vehicle at predetermined angles in a more open top panel assembly position.

* * * * *